United States Patent
Schiffer et al.

(10) Patent No.: US 12,466,442 B2
(45) Date of Patent: Nov. 11, 2025

(54) SYSTEMS AND METHODS FOR INCLUDING SIMULATION NOISE IN PATH PLANNING

(71) Applicant: Honda Motor Co., Ltd., Tokyo (JP)

(72) Inventors: Markus Schiffer, Bellevue, WA (US); Alexandre Miranda Añon, Barcelona (ES); Manish Saroya, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 18/304,914

(22) Filed: Apr. 21, 2023

(65) Prior Publication Data

US 2024/0351614 A1    Oct. 24, 2024

(51) Int. Cl.
*B60W 60/00* (2020.01)
*B60W 50/02* (2012.01)
*B60W 50/00* (2006.01)

(52) U.S. Cl.
CPC .... *B60W 60/0027* (2020.02); *B60W 50/0205* (2013.01); *B60W 2050/0043* (2013.01); *B60W 2554/40* (2020.02)

(58) Field of Classification Search
CPC ............. B60W 60/00; B60W 60/0027; B60W 50/0205; B60W 2050/0043; B60W 2554/40
USPC ............................................. 701/23
See application file for complete search history.

(56) References Cited

U.S. PATENT DOCUMENTS

| | | | |
|---|---|---|---|
| 11,163,068 B2 * | 11/2021 | Balog | G01S 19/215 |
| 11,749,250 B2 * | 9/2023 | Tani | G10K 11/17833 |
| | | | 381/71.4 |
| 11,767,032 B2 * | 9/2023 | Zhao | G05D 1/0293 |
| | | | 701/26 |
| 12,204,823 B1 * | 1/2025 | Capell | G06N 20/00 |
| 12,228,472 B2 * | 2/2025 | Sun | B60W 50/0205 |
| 2022/0212694 A1 * | 7/2022 | Varnhagen | B60W 60/0018 |
| 2025/0111105 A1 * | 4/2025 | Capell | G06N 5/04 |

* cited by examiner

*Primary Examiner* — Andrew Joseph Rudy
(74) *Attorney, Agent, or Firm* — Rankin, Hill & Clark LLP

(57) ABSTRACT

Systems and methods for training a neural network for generating a reasoning statement are provided. In one embodiment, a method includes receiving raw data regarding a raw simulation for an ego agent. The raw simulation includes at least one dynamic object. The method also includes generating a noisy simulation by applying a first input noise of a plurality of input noises to the raw simulation. The method further includes predicting one or more object trajectories for the at least one dynamic object. The method yet further includes generating an ego trajectory for the ego agent in the noisy simulation based on the one or more object trajectories. The method includes causing the ego agent to execute the ego trajectory.

20 Claims, 7 Drawing Sheets

SYSTEMS AND METHODS FOR INCLUDING SIMULATION NOISE IN PATH PLANNING

BACKGROUND

Modeling and predicting future trajectories plays an indispensable role in many applications such as autonomous driving, path planning, motion capture, behavior understanding, etc. In such applications, the goal of the trajectory prediction is to output the future locations of target agents conditioned on their historic movements. This is a challenging modeling task because movement patterns are both complex and subtle to quantify. Furthermore, existing methods typically simulate the observations of agents as totally complete and with all agents acting rationally with ideal kinematics, such as gradual and constant braking. However, real world agents may not always act rationally or exhibit ideal kinematics. Accordingly, the simulation may not accurately model the uncertainty experienced by the agent.

BRIEF DESCRIPTION

According to one aspect, a system for including simulation noise in path planning is provided. The system includes a memory storing instructions that when executed by a processor cause the processor to receive raw data regarding a raw simulation for an ego agent. The raw simulation includes at least one dynamic object. The instructions when executed by the processor also cause the processor to generate a noisy simulation by applying a first input noise of a plurality of input noises to the raw simulation. The instructions when executed by the processor further cause the processor to predict one or more object trajectories for the at least one dynamic object. The instructions when executed by the processor yet further cause the processor to generate an ego trajectory for the ego agent in the noisy simulation based on the one or more object trajectories. The instructions when executed by the processor also cause the processor to cause the ego agent to execute the ego trajectory.

According to another aspect, a computer-implemented method for including simulation noise in path planning is provided. The computer-implemented method includes receiving raw data regarding a raw simulation for an ego agent. The raw simulation includes at least one dynamic object. The computer-implemented method also includes generating a noisy simulation by applying a first input noise of a plurality of input noises to the raw simulation. The computer-implemented method further includes predicting one or more object trajectories for the at least one dynamic object. The computer-implemented method yet further includes generating an ego trajectory for the ego agent in the noisy simulation based on the one or more object trajectories. The computer-implemented method includes causing the ego agent to execute the ego trajectory.

According to a further aspect, a non-transitory computer readable storage medium storing instructions that when executed by a computer having a processor to perform a method for including simulation noise in path planning is provided. The method includes receiving raw data regarding a raw simulation for an ego agent. The raw simulation includes at least one dynamic object. The method also includes generating a noisy simulation by applying a first input noise of a plurality of input noises to the raw simulation. The method further includes predicting one or more object trajectories for the at least one dynamic object. The method yet further includes generating an ego trajectory for the ego agent in the noisy simulation based on the one or more object trajectories. The method includes causing the ego agent to execute the ego trajectory.

DETAILED DESCRIPTION

Figure 1A:
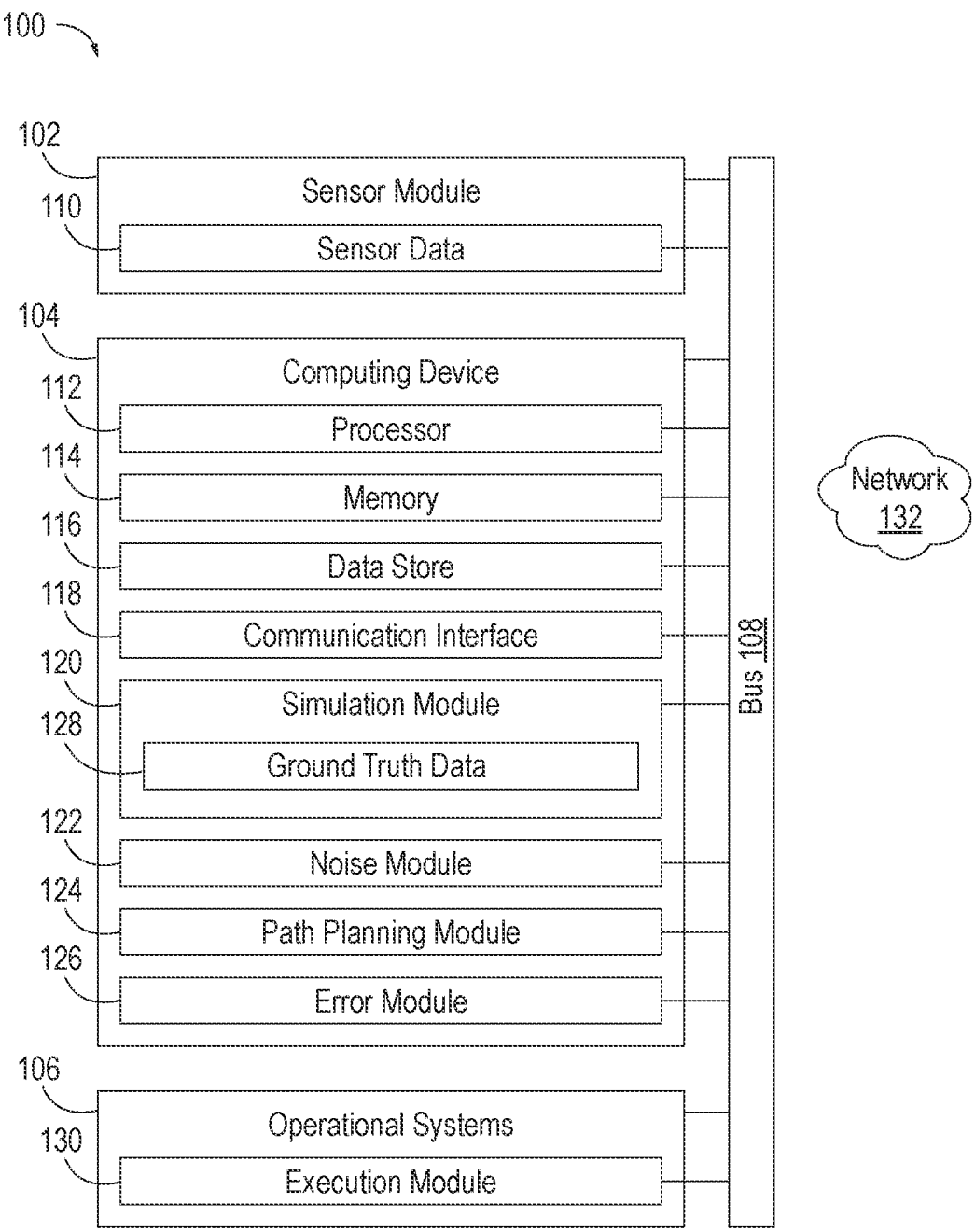
FIG. 1A is an exemplary component diagram of a system for including simulation noise in path planning, according to one aspect.

As discussed above, real world agents do not always act rationally or exhibit ideal kinematics. However, in a raw simulation, an ego agent may have complete knowledge and perfect observations of all objects in the environment of the ego agent. Furthermore, in the raw simulation, dynamic objects may exhibit ideal kinematics such as braking and accelerating gradually and constantly, maintaining a constant velocity, and maintaining adequate following distance, among others. Therefore, the raw simulation may not accurately model the uncertainty experienced by an ego agent in the real-world.

The systems and methods described herein include simulation noise in a raw simulation for path planning to generate a noisy simulation that models the uncertainty experienced in the real-world. By including input noise to generate a noisy simulation, slight variations are generated in the noisy simulation that may be evaluated in repeated scenarios. The robustness of path planning may be determined by evaluating the noisy simulation. For example, a path planning module may successfully determine ego trajectories for the ego agent 90% of the time, but 10% of the input noise may cause an error in an ego trajectory of the ego agent. By including one or more types of input noise, the systems and methods described herein allow input noise to be selectively included in a raw simulation to generate a custom noisy simulation that reveals the errors that may occur in the real world. Furthermore, input noise may be included in a number of iterations automatically. The agent systems or a neural network of the ego agent may be trained in a manner that better reflects the real world in a systematic and automatic way that improves path planning.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or operation. Exemplary systems include, but are not limited to: an electronic stability control system, an anti-lock brake system, a brake assist system, an automatic brake prefill system, a low speed follow system, a cruise control system, a warning system, a mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft.

I. System Overview

Referring now to the drawings, the drawings are for purposes of illustrating one or more exemplary embodiments and not for purposes of limiting the same. FIG. 1A is an exemplary component diagram of an operating environment for including simulation noise in path planning, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 1B:
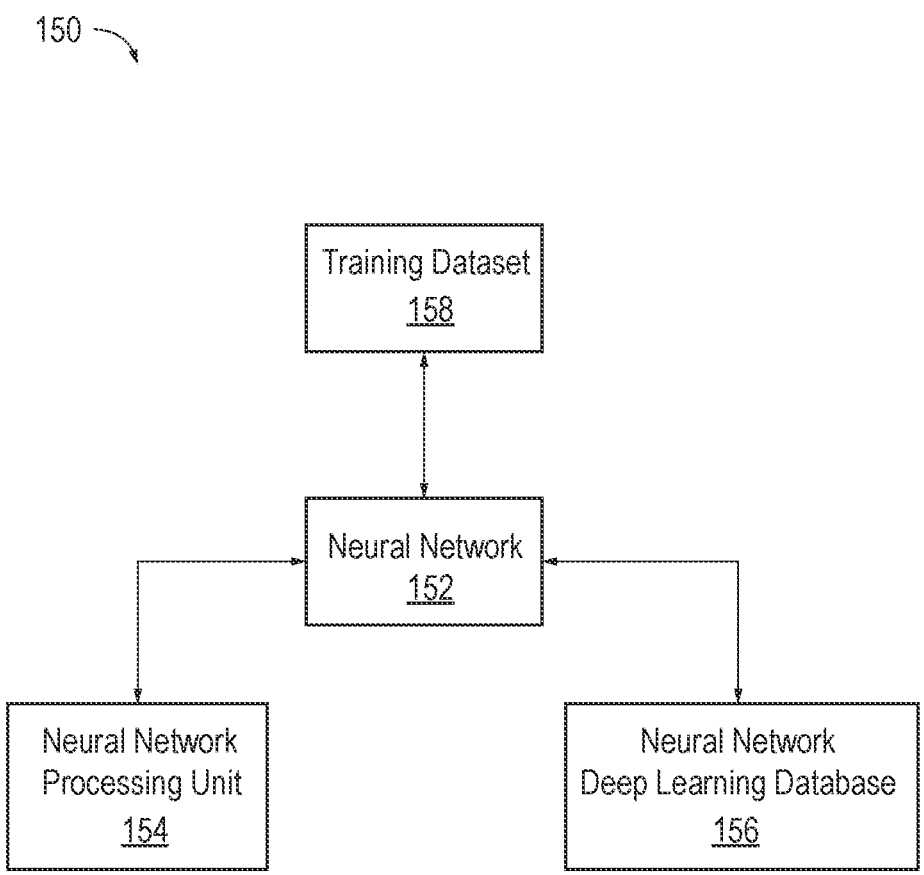
FIG. 1B is an exemplary component diagram of a neural network architecture for a system for including simulation noise in path planning, according to one aspect.
Figure 2:
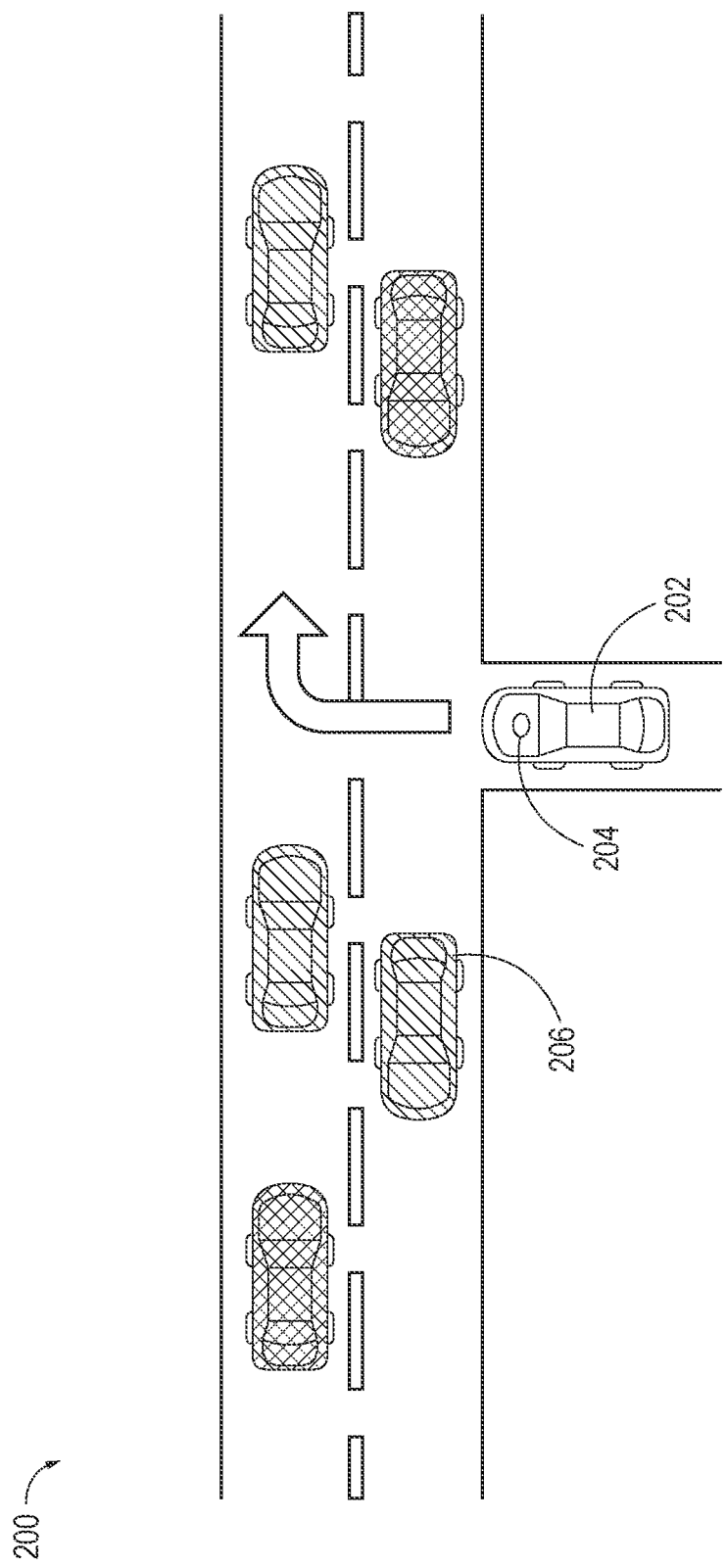
FIG. 2 is an exemplary agent environment of a system for including simulation noise in path planning, according to one aspect.

The computing device 104 may be implemented as a part of an ego agent, such as the ego agent 202 of the at least one roadway environment 200, shown in FIG. 2 or a training agent. The training agent is an agent being trained using the operating environment 100. For clarity, the training agent will be described as the ego agent 202 such that a neural network 152, shown in FIG. 1B, may be trained for the ego agent 202. However, the ego agent 202 may be any agent or even software in execution in the operating environment 100. The ego agent 202 may correspond to a real-world vehicle that may host the operating environment 100. For example, as will be described in greater detail below, the operating environment 100 may include a simulation module 120 that includes a neural network architecture 150 of a system for training a neural network 152 of a remote training agent.

The ego agent 202 may be a bipedal, two-wheeled or four-wheeled robot, a vehicle, or a self-propelled machine. For example, in another embodiment, the ego agent 202 may be configured as a humanoid robot. The ego agent 202 may take the form of all or a portion of a robot. The computing device 104 may be implemented as part of a telematics unit, a head unit, a navigation unit, an infotainment unit, an electronic control unit, among others of the ego agent 202. In other embodiments, the components and functions of the computing device 104 may be implemented with other devices (e.g., a portable device) or another device connected via a network (e.g., a network 132) or using the neural network architecture 150.

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The ego agent 202 may include agent sensors for sensing objects and the at least one roadway environment 200 in simulation or in the real-world. For example, the ego agent 202 in the real-world may include an image sensor 204. The image sensor 204 may be a light sensor to capture light data from around the ego agent 202. For example, a light sensor may rotate 360 degrees around ego agent 202 and collect the sensor data 110 in sweeps. Conversely, an image sensor 204 may be omnidirectional and collect sensor data 110 from all directions simultaneously. The image sensor 204 of the ego agent 202 may emit one or more laser beams of ultraviolet, visible, or near infrared light toward the surrounding environment of the ego agent 202. In some embodiments, the image sensor 204 may be a monocular camera. The sensor data 110 captured by the ego agent 202 in the real-world may be used as the sensor data 110 received by the ego agent 202 in the raw simulation.

The image sensor 204 may positioned on the ego agent 202. For example, suppose that the ego agent 202 is a vehicle in the real-world. One or more agent sensors may be positioned at external front and/or side portions of the ego agent 202, including, but not limited to different portions of the vehicle bumper, vehicle front lighting units, vehicle fenders, and the windshield. Additionally, the agent sensors may be disposed at internal portions of the ego agent 202 including, in a vehicular embodiment, the vehicle dashboard (e.g., dash mounted camera), rear side of a vehicle rear view mirror, etc. The agent sensors may be positioned on a planar sweep pedestal (not shown) that allows the image sensor 204 to be rotated to capture images of the environment at various angles.

The image sensor 204 is associated with intrinsic parameters. The intrinsic parameters link the pixel coordinates of an image with corresponding coordinates in the camera reference frame. The intrinsic parameters identify the transformation between the camera reference frame and the world reference frame. For example, the intrinsic parameters may include the position, angle, field of view (FOV), location, etc. of the image sensor 204, the size of pixels in the image, and the orientation of the image sensor 204, among others.

Accordingly, the agent sensors, such as the image sensor 204, and/or the sensor module 102 are operable to sense a measurement of data associated with the ego agent 202, the operating environment 100, the at least one roadway environment 200, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module as an input image. Based on the location of the image sensor 204, the input image may be a perspective space image defined relative to the position and viewing direction of the ego agent 202.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a simulation module 120, a noise module 122, a path planning module 124, and an error module 126 enabled by the processor 112 for training a neural network 152 for including simulation noise in path planning facilitated by the components of the operating environment 100 and the neural network architecture 150.

The simulation module 120, the noise module 122, the path planning module 124, and/or the error module 126, may be artificial neural networks that act as a framework for machine learning, including deep reinforcement learning, and may include the network architecture of FIG. 1B. The neural network 152 of the neural network architecture 150 may be a convolution neural network (CNN), a conditional generative adversarial network (cGAN) etc., or the simulation module 120, the noise module 122, the path planning module 124, and/or the error module 126 may include additional artificial networks. For example, the simulation module 120, the noise module 122, the path planning module 124, and/or the error module 126 may be a CNN. In one embodiment, the simulation module 120, the noise module 122, the path planning module 124, and/or the error module 126 may include a cGAN. In another embodiment, the simulation module 120, the noise module 122, the path planning module 124, and/or the error module 126 may include an input layer, an output layer, and one or more hidden layers, which may be convolutional filters. In some embodiments, one or more of simulation module 120, the noise module 122, the path planning module 124, and/or the error module 126 may include Long Short Term Memory (LSTM) networks and LSTM variants (e.g., E-LSTM, G-LSTM, etc.).

In one or more embodiments, the neural network architecture 150 includes a neural network 152 such as the neural networks described above. The neural network 152 may include a neural network processing unit 154 and a neural network deep learning database 156. The neural network processing unit 154 may be configured to utilize machine learning/deep learning to provide artificial intelligence capabilities that may be utilized to build and maintain the neural network deep learning database 156 with various types of data. The neural network processing unit 154 may process information that is provided as inputs and may utilize the neural network deep learning database 156 to access stored computer/machine learned data to provide various functions, that may include, but may not be limited to, object classification, feature recognition, computer vision, speed recognition, machine translation, autonomous driving commands, and the like.

In one embodiment, the neural network 152 may be trained using ground truth data 128. Generally, the ground truth data 128 may include one or more object trajectories for dynamic objects and corresponding ego trajectories for the ego agent 202. The ground truth data 128 may be based on the sensor data 110. For example, simulations may be based on scenarios encountered by the ego agent 202 in the real-world and the corresponding sensor data 110. The ground truth data 128 may also be based on intrinsic parameters associated with the agent sensors, such as the image sensor 204.

In one or more embodiments, the neural network deep learning database 156 may store road user classification data based on the sensor data 110 provided by the agent sensors. In some embodiments, one or more of the simulation module 120, the noise module 122, the path planning module 124, and/or the error module 126 may communicate with the neural network processing unit 154 to determine object kinematics, such as trajectories, based on the sensor data 110 and/or the ground truth data. In some embodiments, the neural network processing unit 154 may analyze the sensor data 110 by utilizing the neural network deep learning database 156 to calculate the ground truth data 128.

The computing device 104 is also operably connected for computer communication (e.g., via the bus 108 and/or the communication interface 118) to one or more operational systems 106. The operational systems 106 may include, but are not limited to, any automatic or manual systems that may be used to enhance the ego agent 202, a training agent, operation, and/or propulsion. The operational systems 106 include an execution module 130. The execution module 130 may monitor, analyze, and/or operate the ego agent 202, to some degree based on the training received via the error module 126 and corresponding neural network. For example, the execution module 130 may store, calculate, and provide directional information and facilitate features like vectoring and obstacle avoidance among others based on a training data 158. In a vehicular embodiment, the execution module 130 may provide operational data to agent systems, such as the steering system, that cause the ego agent 202 to operate autonomously. In some embodiments, the execution module 130 may be a Proportional, Integral, Derivative (PID) controller. The operational systems 106 may be dependent on the implementation.

The operational systems 106 include and/or are operably connected for computer communication to the sensor module 102. For example, one or more sensors of the sensor module 102, such as the image sensor 204, may be incorporated with execution module 130 to monitor characteristics of the environment of the ego agent 202 or the ego agent 202 itself. For example, in the vehicular embodiment, the image sensor 204 may be incorporated with execution module 130 to monitor characteristics of the at least one roadway environment 200. Suppose that the execution module 130 is facilitating execution of a right turn onto a street. The execution module 130 may receive sensor data 110 from the sensor module 102 to confirm that vehicles present on the street are yielding as expected.

The sensor module 102, the computing device 104, and/or the operational systems 106 are also operatively connected for computer communication to the network 132. The network 132 is, for example, a data network, the Internet, a wide area network (WAN) or a local area network (LAN) network. The network 132 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Including Simulation Noise

Figure 3:
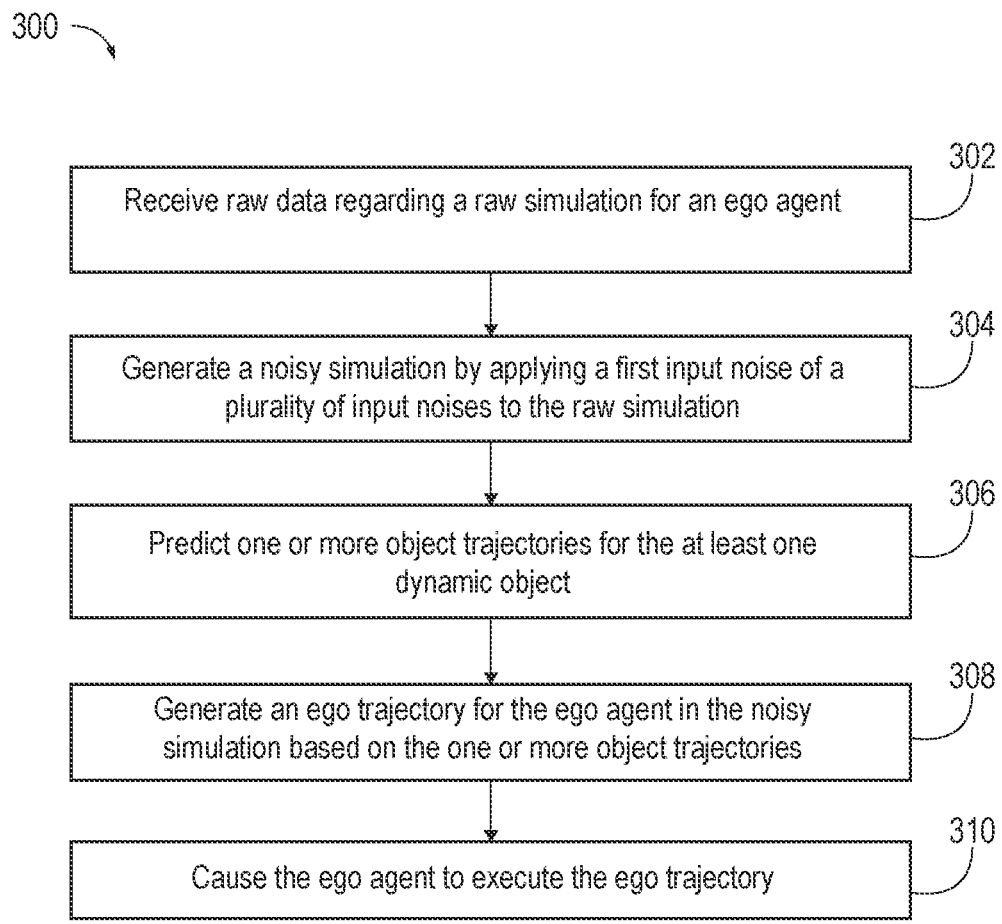
FIG. 3 is an exemplary process flow of a method for including simulation noise in path planning, according to one aspect.

Referring now to FIG. 3, a method 300 for including simulation noise in path planning will now be described according to an exemplary embodiment. FIG. 3 will also be described with reference to FIGS. 1, 2, and 4-6. For simplicity, the method 300 will be described as a sequence of blocks, but it is understood that the blocks of the method 300 may be organized into different architectures, elements, stages, and/or processes.

At block 302, the method 300 includes the simulation module 120 receiving raw data regarding a raw simulation for an ego agent 202. The raw simulation may be a simulated deterministic system that generates training scenarios for agent embodiments based on simple physics rules and set training parameters. The agent embodiments may include vehicular embodiments. A time horizon may be set for each scenario in order to generate a number of scenes based on raw data. The raw data may include, for example, the sensor data 110, ground truth data 128, historic sensor data, etc. The raw data may include an agent, such as the ego agent 202, having to traverse a simulated environment to achieve a goal state in the training scenario.

The simulated environment may include a roadway configuration and the goal state may be completing a predetermined maneuver. For example, the roadway configuration may include the ego agent 202 attempting to merge onto a highway from an entrance ramp or turning left through an intersection. As another example, the simulated environment may be a set of rooms that the ego agent 202 traverses to collect an item. The raw data may include information about the simulated environment, such as the roadway configuration (e.g., number of lanes, type of lane markings, signage, historical motion data for dynamic objects such as proximate vehicles, location information of static objects, such as ramps, cones, and traffic lights, etc.) or the set of rooms (e.g., room layout, historical motion data for dynamic objects such as pets and children, location information of static objects, such as furniture, etc.)

The number of training scenarios may be generated for validation and testing based on the raw data and simple physics rules. The simple physics rules may generalize objects and make assumptions about the simulated environment. For example, the simple physics rules may generalize and/or idealize the impacts of drag. The raw simulation may also make assumptions about the behavior of at least one dynamic objects in the simulated environment. The dynamic objects are able to traverse the simulated environment. The assumptions may include the dynamic objects conforming to all traffic rules and laws and exhibiting ideal behavior, such as gradual and constant braking, correct use of signaling, etc.

At block 304, the method 300 includes the noise module 122 generating a noisy simulation by applying a first input noise of a plurality of input noises to the raw simulation. The first input noise may add uncertainty to features of the raw simulation by adjusting simulation parameters that are used to calculate kinematics (e.g. motion properties, position, velocity, acceleration, etc.) of one or more dynamic objects and the ego agent 202. Additionally or alternatively, the noise module 122 may add noise through signal processing, for example, by adding gaussian noise, to features of the raw simulation. The aspects of the raw simulation may include the localization of ego agent 202, dynamic perception of other agents, the ego agent 202 conforming to boundaries of the roadway, and control of the ego agent 202.

The noise module 122 adds a first input noise which may be one of localization noise, dynamic object perception noise, boundary noise, and planner control noise to the raw simulation in a minimally intrusive manner to generate the noisy simulation. The localization noise, the dynamic object perception noise, and the boundary noise correspond to the features of raw simulation: the localization of ego agent 202, dynamic perception of other agents, and perception of boundaries of the roadway environment 200. The planner control noise is directed to control of the ego agent 202, respectively. Accordingly, the feature type noise includes the localization noise, the dynamic object perception noise, and the boundary noise and control type noise includes the planner control noise. Thus, a plurality of noises may include feature type noises and a control type noise.

Generally, the localization noise adds uncertainty to an ego position of the ego agent 202. For example, the ego position may be based on a previous ego position of the ego agent 202. The localization noise may adjust the previous ego position from a single value to a range of values. The dynamic perception noise adds uncertainty to the perception of other dynamic objects in the raw simulation. Like the localization, the dynamic object position may be based on a previous dynamic object position of the dynamic object, such as a proximate vehicle. The dynamic perception noise may adjust the previous dynamic object position from a single value to a range of values. The boundary noise adds uncertainty to position of the ego agent within a boundary, such as a lane in the raw simulation. For example, the boundary may be defined by a lane marker having a boundary position value that denotes the position of the boundary as a single value. The boundary noise may adjust the single boundary position value to a range of values. In this manner, the feature type noises add uncertainty to the raw simulation by expanding the values representing different features in the raw simulation. Alternatively, the feature type noises may remove some values from the raw simulation to add uncertainty to the noisy simulation. For example, if the position values for the boundaries of the roadway are known at a number of different points, then the noise module may delete one or more of the position values.

The planner control noise may adjust values for control that may otherwise be executed by the execution module 130. For example, the control noise may delay and slightly modify an ego trajectory of the ego agent, which adds noise to the way that the ego agent 202 moves. As another example, the ego agent 202 may accelerate faster or slower than is called for by the raw simulation. In this manner, the planner control noise may tweak the response of the ego agent 202.

At block 306, the method 300 includes the path planning module 124 predicting one or more object trajectories for the at least one dynamic object 206. Predicting the one or more object trajectories may include estimating future locations of the at least one dynamic object 206 for future time steps based on the previous dynamic object positions from previous time steps in the noisy simulation. For example, the previous time steps may include a number of discrete time steps from time step $t_1$ to $t_p$ and meanwhile predict their future trajectory may be predicted from time step $t_{p+1}$ to $t_f$. The one or more object trajectories may include the predicted position, direction, velocity, and acceleration of the at least one dynamic object 206.

The path planning module 124 may include Graph-based Conditional Variational Recurrent Neural Network (GC-VRNN) to calculate the previous dynamic object position from either a single value or a range of values, based on the type of noise added by the first input noise. The path planning module 124 may also use the GC-VRNN to predict the one or more object trajectories for the at least one dynamic object 206 based on the previous dynamic object position. A Conditional VRNN may be adopted to model temporal dependencies for future time steps.

At block 308, the method 300 includes the path planning module 124 generating an ego trajectory for the ego agent 202 in the noisy simulation based on the one or more object trajectories. In some embodiments, the ego trajectory may include a number of simulation parameters that define the ego trajectory. The simulation parameters may include the position, direction, velocity, and acceleration for the ego agent. The simulation parameters may also include time windows that will be discussed below in grater detail with respect to an ego time window and an objection time window. The simulation parameters may be dynamic at different points in the ego trajectory. Accordingly, the simulation parameters may be assigned time steps for a number of time steps to a time horizon corresponding to the amount of time expected to complete the ego trajectory for the ego agent 202. The ego trajectory may be generated for the ego agent 202 to avoid the predicted path of the at least one dynamic object 206.

At block 310, the method 300 includes the execution module 130 causing the ego agent 202 to execute the ego trajectory in the noisy simulation. For example, the execution module 130 may provide operational data to agent systems of the ego agent, such as the steering system, that cause the ego agent 202 to traverse the roadway according to the ego trajectory. The object trajectories may order executable instructions in a sequential order.

The execution module 130 may include the neural network architecture 150. By causing the ego agent 202 to execute the ego trajectory in the noisy simulation, the execution module 130 may train the neural network 152 to generate ego trajectories for the ego agent 202 based on successful ego trajectories. An ego trajectory may be successful if the ego agent 202 is able to traverse the ego trajectory in the noisy simulation without an error as will described in greater detail with respect the method 400. As one example, an ego trajectory may be deemed successful if the ego agent 202 traverses the ego trajectory within the boundaries of the roadway and without interference. Thus, the execution module 130 may yield output parameters that indicate how the ego agent 202 performed in the noisy simulation. The output parameters may include the kinematics experienced by the ego agent in the noisy simulation.

The training data 158 set may include one more successful ego trajectories for a scenario in the noisy simulation. In one embodiment, upon generating the training data 158, the neural network 152 may be trained by causing the neural network processing unit 154 to evaluate the ego trajectories. For example, the error module 126 may cause the neural network 152 to parse the output parameters, such as the ego trajectories of the training data 158 to differentiate the simulation parameters or identify simulation parameters that are common to the ego trajectories of the training data 158. In one embodiment, the differentiated simulation parameters and/or common simulation parameters may be organized and stored by the neural network deep learning database 156.

Figure 4:
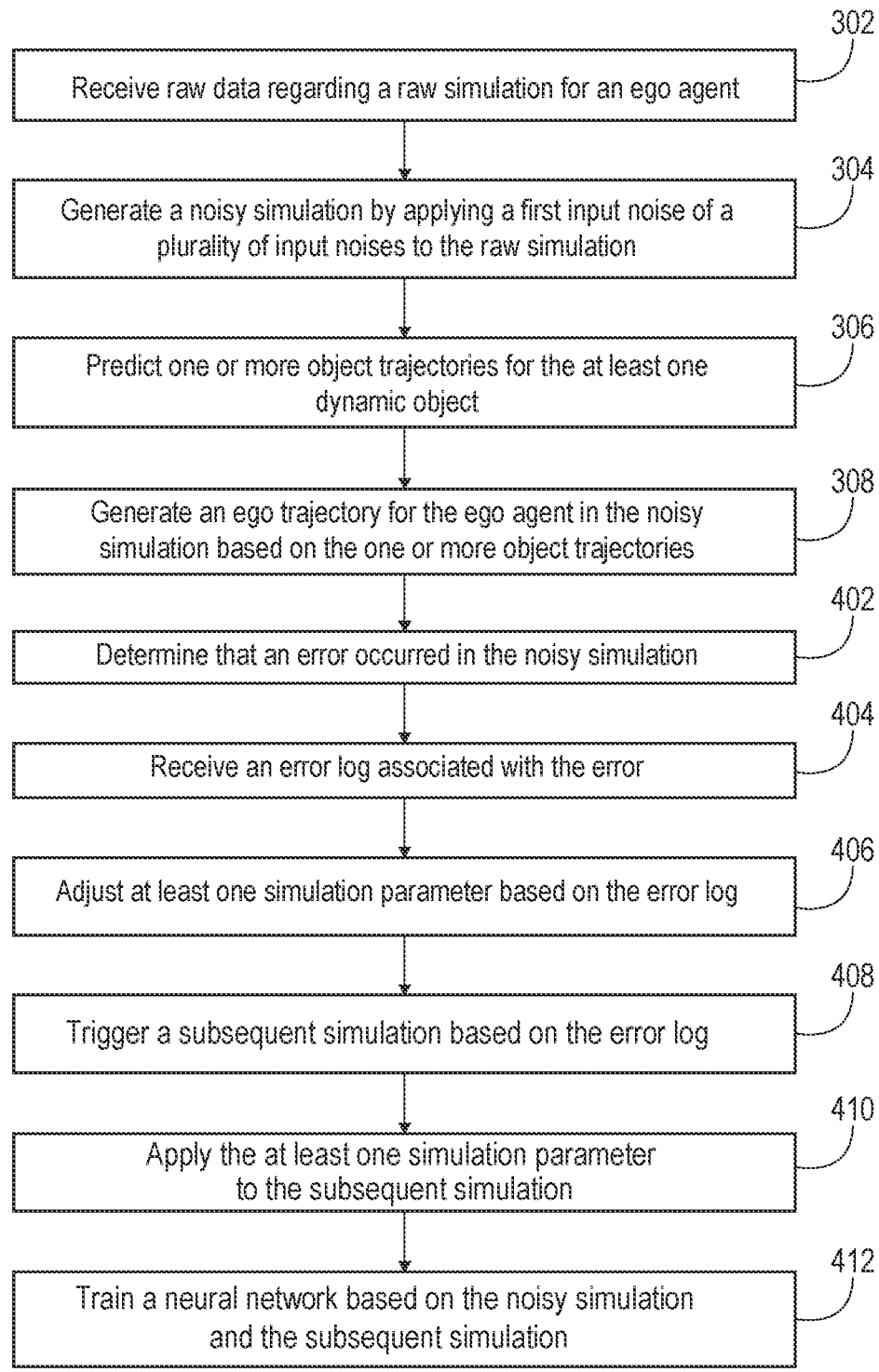
FIG. 4 is another exemplary process flow of a method for including simulation noise in path planning, according to one aspect.

Referring now to FIG. 4, a method 400 for including simulation noise in path planning will now be described according to an exemplary embodiment. FIG. 4 will also be described with reference to FIGS. 1-3 5, and 6. For simplicity, the method 400 will be described as a sequence of blocks, but it is understood that the blocks of the method 400 may be organized into different architectures, elements, stages, and/or processes.

The blocks of the method 400 includes blocks described with respect to the method 300 that operate in a similar manner as described above. At block 302, the method 400 includes the sensor module 102 receiving raw data regarding a raw simulation for an ego agent 202. At block 304, the method 400 includes the noise module 122 generating a noisy simulation by applying a first input noise of a plurality of input noises to the raw simulation. At block 306, the method 400 includes the path planning module 124 predicting one or more object trajectories for the at least one dynamic object. At block 308, the method 400 includes the path planning module 124 generating an ego trajectory for the ego agent 202 in the noisy simulation based on the one or more object trajectories.

At block 402, the method 400 includes the error module 126 determining that an error occurred in the noisy simulation. The error module 126 may detect a number of different types of errors. For example, the error types may include a simulation error, an interference error, a traversal error, and a user experience error, among others.

The error module 126 may detect a simulation if the noisy simulation is not able to complete an iteration. The noisy simulation may be run for multiple iterations. Each iteration of the noisy simulation may include a plurality of time steps that terminate at a time horizon. If noisy simulation is unable to affect the ego agent 202 to perform the ego trajectory and/or the at least one dynamic object 206 to perform the one or more object trajectories for a predetermined number of time steps, the error module may detect a simulation error.

The error module 126 may detect an interference error when the ego trajectory is not able to be completed in the noisy simulation without interference. The error module 126 may detect an interference error if the ego agent 202 and the at least one dynamic object attempt to occupy the same location at the same timestep or within a time window including a number of time steps. For example, the ego agent 202 may be associated with an ego time window including a first set of time steps and the at least one dynamic object 206 may be associated with an object time window including a second set of time steps that includes one or more time steps from the first set of time steps. The error module 126 may detect an error if the ego agent 202 or the at least one dynamic object 206 occupies the location during their respective time window.

As another example, the error module 126 may detect a traversal error if the ego trajectory causes the ego agent to leave roadway configuration or roadway feature. For example, an error may be detected if the ego agent leaves a lane based on lane markings in the noisy simulation. The error module 126 may also detect an error if the ego agent 202 deviates from the roadway configuration or roadway feature by a predetermined distance. The roadway configuration may include a curved lane that defines a longitudinal centerline in the direction of travel. The ego trajectory may include simulation parameters that cause the ego agent 202 to traverse the longitudinal centerline defined by the lane boundaries of the curved lane.

In some embodiments, the error module 126 may detect a user experience error if the ego agent 202 deaccelerates or accelerates aggressively resulting in the ego agent 202 experiencing jerk in the noisy simulation. For example, the noisy simulation may result in a jerk value that is compared to a predetermined jerk threshold. In this manner, the error module 126 may detect an error associated with the user experience of a vehicle occupant.

At block 404, the method 400 includes the error module 126 receiving an error log associated with the error. As the noisy simulation may be run for multiple iterations, one or more errors may be detected in one iteration of a plurality of iterations. For example, if the noisy simulation is run for one hundred iterations, the error module 126 may detect one or more errors from any category. The first to fortieth iterations may not result in any errors, however, the error module 126 may detect an interference error in the forty-first iteration and a traversal error and a user experience error in the forty-second iterations, and so on. Accordingly, the error log may include the interference error, the traversal error, and the user experience error. In some embodiments, the error log may sort the errors by the error type and/or the iteration of the noisy simulation.

At block 406, the method 400 includes the error module 126 adjusting at least one simulation parameter based on the error log. In some embodiments, the at least one simulation parameter may be adjusted by the neural network 152. For example, the training data 158 set may include the error log.

In one embodiment, upon generating the training data 158 the neural network 152 may be trained by causing the neural network processing unit 154 to evaluate the of ego trajectories having errors. For example, the error module 126 may cause the neural network 152 to parse the ego trajectories having errors to differentiate the simulation parameters or identify simulation parameters that are common to the ego trajectories that have errors. In one embodiment, the differentiated simulation parameters and/or common simulation parameters may be organized and stored by the neural network deep learning database 156. In one embodiment, the error module 126 may adjust at least one simulation parameter for identified common simulation parameters.

At block 408, the method 400 includes the simulation module 120 triggering the subsequent simulation based on the error log. For example, a first set of iterations may be run with the noisy simulation. Then the simulation module 120 may configure the subsequent simulation for a second set of iterations.

At block 410, the method 400 includes the simulation module 120 applying the at least one adjusted simulation parameter to the subsequent simulation. Accordingly, the error module 126 may adjust simulation parameters to determine if a kinematic property of the ego trajectory, represented by the adjusted simulation parameter, in an attempt to avoid incurring an error in the subsequent simulation.

At block 412, the method 400 includes training a neural network based on the noisy simulation and the subsequent simulation the neural network 152 may be trained to avoid generating ego trajectories with simulation parameters that result in errors. For example, a simulation parameter that results in a number of errors that exceed an error threshold may not be used in similar scenarios.

Figure 5:
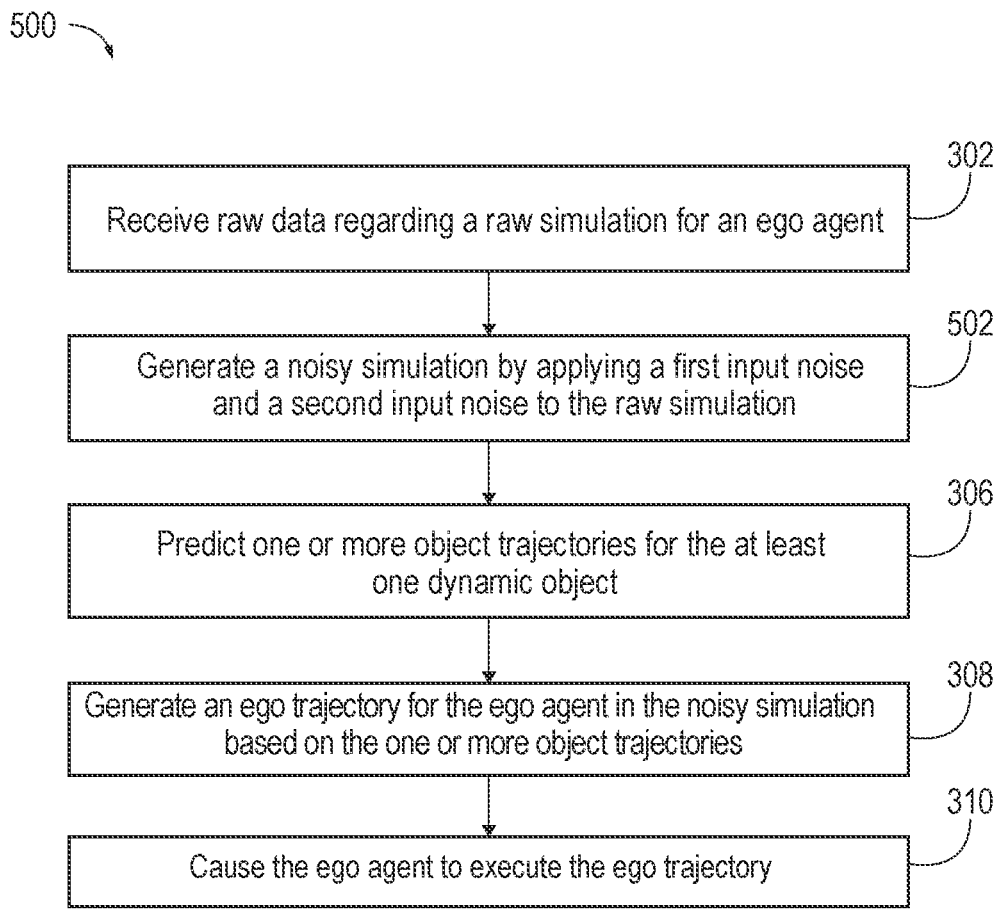
FIG. 5 is yet another exemplary process flow of a method for including simulation noise in path planning, according to one aspect.

Referring now to FIG. 5, a method 500 for including simulation noise in path planning will now be described according to an exemplary embodiment. FIG. 5 will also be described with reference to FIGS. 1-4, and 6. For simplicity, the method 500 will be described as a sequence of blocks, but it is understood that the blocks of the method 500 may be organized into different architectures, elements, stages, and/or processes. The blocks of the method 500 includes blocks described with respect to the method 300 that operate in a similar manner as described above.

At block 302, the method 500 includes the sensor module 102 receiving raw data regarding a raw simulation for an ego agent 202. The raw simulation includes at least one dynamic object 206.

At block 502, the method 500 includes the noise module 122 generating a noisy simulation by applying a first input noise and a second input noise of a plurality of input noises to the raw simulation. In one embodiment, the first input noise may include one or more of the feature type of noise including localization noise, dynamic object perception noise, and boundary noise. The second input noise may be from the control type noise including planning control noise.

At block 306, the method 500 includes the path planning module 124 predicting one or more object trajectories for the at least one dynamic object. At block 308, the method 500 includes the path planning module 124 generating an ego trajectory for the ego agent 202 in the noisy simulation based on the one or more object trajectories. At block 310, the method 500 includes the execution module 130 causing the ego agent 202 to execute the ego trajectory.

Figure 6:
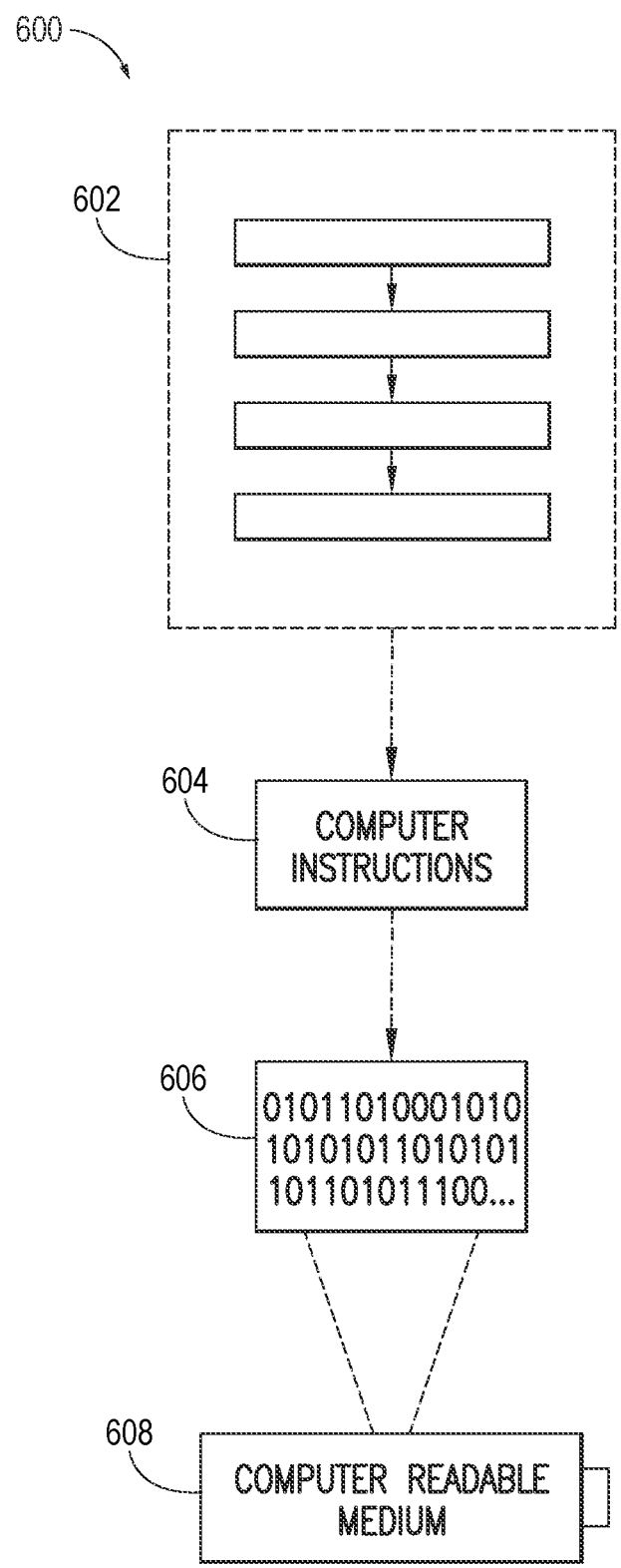
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3, the method 400 of FIG. 4, and the method 500 of FIG. 5. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for including simulation noise in path planning, comprising:
a memory storing instructions that when executed by a processor cause the processor to:
receive raw data regarding a raw simulation for an ego agent, wherein the raw simulation includes at least one dynamic object;
generate a noisy simulation by applying a first input noise of a plurality of input noises to the raw simulation, wherein the noisy simulation models uncertainty experienced by the ego agent in real-world environments;
predict one or more object trajectories for the at least one dynamic object based on previous dynamic object positions from previous time steps in the noisy simulation;
generate an ego trajectory for the ego agent in the noisy simulation based on the one or more object trajectories wherein the ego trajectory includes executable instructions for causing the ego agent to traverse a roadway configuration; and
cause the ego agent to execute the ego trajectory by providing operational data to agent systems of the ego agent.

2. The system of claim 1, further comprising instructions that when executed by the processor cause the processor to:
determine that an error occurred in the noisy simulation by detecting at least one of: an interference error when the ego agent and the at least one dynamic object attempt to occupy a same location within a time window, a traversal error when the ego trajectory causes the ego agent to leave a roadway configuration, or a user experience error when the ego agent experiences a jerk value exceeding a jerk threshold;
receive an error log associated with the error; and
trigger a subsequent simulation based on the error log.

3. The system of claim 2, wherein the ego trajectory is based on the one or more object trajectories and a number of simulation parameters, instructions that when executed by the processor further cause the processor to:
adjust at least one simulation parameter of the number of simulation parameters based on the error log; and
apply the at least on adjusted simulation parameter to the subsequent simulation.

4. The system of claim 2, wherein the error is based on the executed ego trajectory including a jerk value exceeding a jerk threshold, wherein the jerk value represents a rate of change of acceleration of the ego agent that would result in an uncomfortable or unsafe ride experience, and wherein the jerk threshold is a predetermined maximum acceptable rate of change of acceleration.

5. The system of claim 1, further comprising instructions that when executed by the processor cause the processor to:
apply a second input noise of the plurality of input noises to the raw simulation, wherein the second input noise includes an amount of the second input noise to include in the raw simulation.

6. The system of claim 1, wherein the plurality of input noises includes a plurality noises of a feature type noise and at least one control noise of a control type noise.

7. The system of claim 6, wherein the feature type noise includes a dynamic object perception noise that adds uncertainty to perception of dynamic objects in the raw simulation, a localization noise that adds uncertainty to an ego position of the ego agent, and a boundary noise that adds uncertainty to position of the ego agent within a boundary of a roadway environment, and wherein the control type noise includes a control noise that adjusts control of the ego agent by modifying an ego trajectory of the ego agent.

8. The system of claim 6, wherein the first input noise is applied from the feature type noise, and wherein a second input noise from the control type noise is applied to the noisy simulation.

9. A computer-implemented method for including simulation noise in path planning, comprising:
receiving raw data regarding a raw simulation for an ego agent, wherein the raw simulation includes at least one dynamic object;
generating a noisy simulation by applying a first input noise of a plurality of input noises to the raw simulation, wherein the noisy simulation models uncertainty experienced by the ego agent in real-world environments;
predicting one or more object trajectories for the at least one dynamic object, based on previous dynamic object positions from previous time steps in the noisy simulation;
generating an ego trajectory for the ego agent in the noisy simulation based on the one or more object trajectories, wherein the ego trajectory includes executable instructions for causing the ego agent to traverse a roadway configuration; and
causing the ego agent to execute the ego trajectory by providing operational data to agent systems of the ego agent.

10. The computer-implemented method of claim 9, further comprising:
determining that an error occurred in the noisy simulation by detecting at least one of: an interference error when the ego agent and the at least one dynamic object attempt to occupy a same location within a time window, a traversal error when the ego trajectory causes the ego agent to leave a roadway configuration, or a user experience error when the ego agent experiences a jerk value exceeding a jerk threshold;
receiving an error log associated with the error; and
triggering a subsequent simulation based on the error log.

11. The computer-implemented method of claim 10, wherein the ego trajectory is based on the one or more object trajectories and a number of simulation parameters, the computer-implemented further comprising:
adjusting at least one simulation parameter of the number of simulation parameters based on the error log; and
applying the at least on adjusted simulation parameter to the subsequent simulation.

12. The computer-implemented method of claim 9, further comprising:
applying a second input noise of the plurality of input noises to the raw simulation, wherein the second input noise includes an amount of the second input noise to include in the raw simulation.

13. The computer-implemented method of claim 9, wherein the plurality of input noises includes a plurality of noises of a feature type noise and at least one control noise of a control type noise.

14. The computer-implemented method of claim 13, wherein the feature type noise includes a dynamic object perception noise, a localization noise, and a boundary noise, and wherein the control type noise includes a control noise.

15. The computer-implemented method of claim 13, wherein the first input noise is applied from the feature type noise, and wherein a second input noise from the control type noise is applied to the noisy simulation.

16. A non-transitory computer readable storage medium storing instructions that when executed by a computer having a processor to perform a method for including simulation noise in path planning, the method comprising:
receiving raw data regarding a raw simulation for an ego agent, wherein the raw simulation includes at least one dynamic object;
generating a noisy simulation by applying a first input noise of a plurality of input noises to the raw simulation, wherein the noisy simulation models uncertainty experienced by the ego agent in real-world environments;
predicting one or more object trajectories for the at least one dynamic object, based on previous dynamic object positions from previous time steps in the noisy simulation;
generating an ego trajectory for the ego agent in the noisy simulation based on the one or more object trajectories, wherein the ego trajectory includes executable instructions for causing the ego agent to traverse a roadway configuration; and
causing the ego agent to execute the ego trajectory by providing operational data to agent systems of the ego agent.

17. The non-transitory computer readable storage medium implemented method of claim 16, further comprising:
applying a second input noise of the plurality of input noises to the raw simulation, wherein the second input noise includes an amount of the second input noise to include in the raw simulation.

18. The non-transitory computer readable storage medium implemented method of claim 16, wherein the plurality of input noises includes a plurality of noises of a feature type noise and at least one control noise of a control type noise.

19. The non-transitory computer readable storage medium implemented method of claim 18, wherein the feature type noise includes a dynamic object perception noise, a localization noise, and a boundary noise, and wherein the control type noise includes a control noise.

20. The non-transitory computer readable storage medium implemented method of claim 18, wherein the first input noise is applied from the feature type noise, and wherein a second input noise from the control type noise is applied to the noisy simulation.

* * * * *